June 24, 1930. A. B. STEUART 1,766,961
FUSELAGE FRAME
Filed Sept. 25, 1929
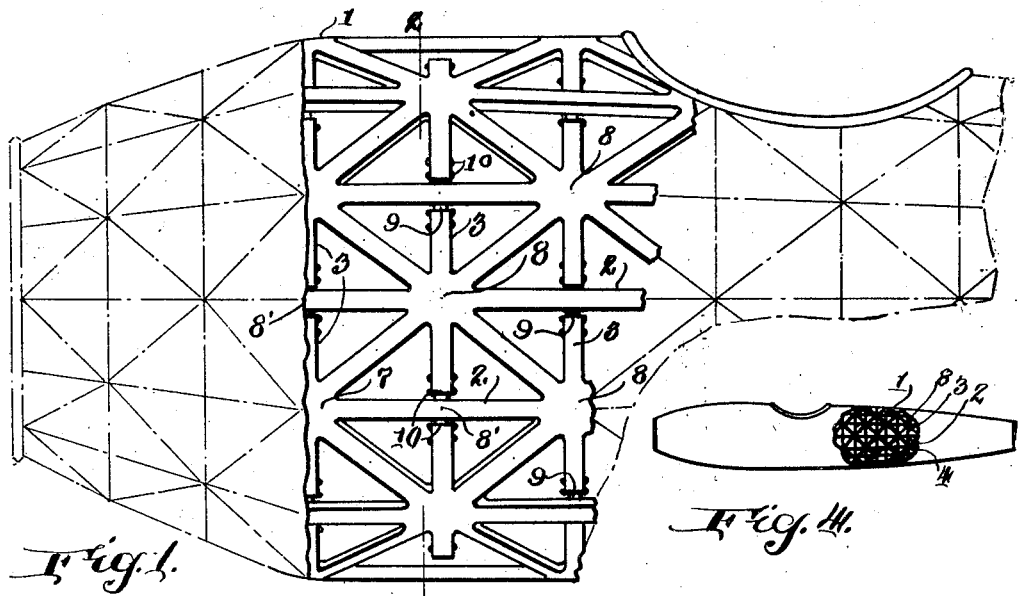
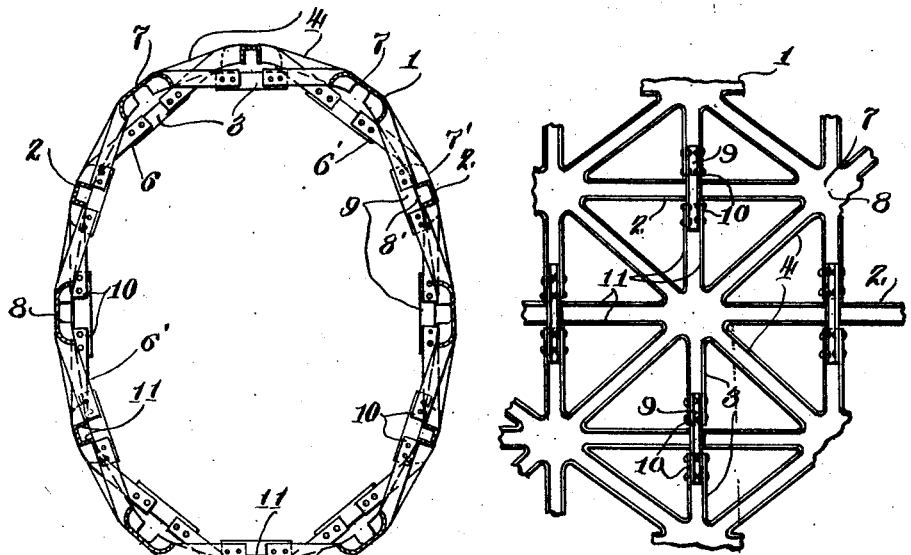

Patented June 24, 1930

1,766,961

UNITED STATES PATENT OFFICE

ARTHUR B. STEUART, OF BALTIMORE, MARYLAND

FUSELAGE FRAME

Application filed September 25, 1929. Serial No. 394,955.

The invention relates particularly to the frame structure of the fuselage or body of an airplane. Such bodies are ordinarily of an elongated oval which is comparatively large at the front having a relatively fine taper toward the rear and the frame structure of the invention is particularly adapted to afford a support for the fuselage covering or walls which may be of fabric or sheet metal or other suitable material.

The principal object of the invention is to evolve a type of body frame which may be stamped out of sheet metal though the structure of the invention in the broader conception may be otherwise produced.

A further object of the invention is to evolve a body design which will give the maximum of strength with the minimum of weight of material and expense and one which can be cheaply and simply constructed and produced quickly and in large quantities.

In the accompanying drawings I have illustrated a fuselage or airplane body frame embodying the features of my invention in the preferred form.

In the drawings:

Figure 1 is an elevation of a more or less fragmentary nature showing the fuselage with the walls or covering partially removed to show the frame, the rear portion being broken away for convenience of illustration.

Figure 2 is a transverse section of the frame taken on the line 2—2 of Figure 1.

Figure 3 is a fragmentary view in the nature of an elevation looking at the frame from the inside.

Figure 4 is an elevation of the entire fuselage drawn to a reduced scale, the wall or covering material being partially removed.

Referring to the drawings by numerals, each of which is used to indicate the same or similar parts in the different figures, the construction shown comprises a fuselage frame or fuselage wall supporting frame 1, consisting of longitudinal members 2, spaced about the transverse circumference of the fuselage, or, as it may be termed, about the cross section of the fuselage. These preferably run the entire length of the fuselage and are connected together by transverse circumferential members 3, preferably extending entirely around the fuselage substantially at right angles to the longitudinal members.

The frame in the preferred form also includes diagonal members 4, extending around the frame at an angle to each of said members 2 and 3, this angle in the form shown approaches 45 degrees, connecting the points of intersection of the transverse members and the longitudinal members. These members 4 preferably extend in the direction just described from end to end of the fuselage so that each of said diagonal members is preferably arranged in a curve which resembles a steep helix, the divergence from the exact helical line being to a large extent due to the divergence of the form of the fuselage from the exact cylindrical outline.

Referring to the cross section, Figure 2, it will be noted that the fuselage in the form illustrated, which is the preferred form, is of elliptical cross section. This elliptical section is intersected by the transverse members 3 to the extent that each of these members as shown and preferably is connected only to every second longitudinal member 2, the alternate transverse circumferential members 3 being, in turn, connected to alternate sets of longitudinal members, As best illustrated in Figure 2, the circumferential members being rectalinear between the alternate longitudinal members which they connect, form cords 6 of the ellipses representing the cross sections of the fuselage at different points so that each transverse circumferential member 3 is in fact in the form of a polygon having a number of sides equal to half the number of longitudinal members. Each side 3' is a cord of the corresponding ellipse representing the cross section of the frame.

In the present instance each transverse member is in the form of a hexagon although the number of sides may obviously be varied without departure from the spirit of the invention and these hexagonal transverse members 3 are arranged with their respective corners or vertices 7, 7, alternating, i. e. connecting with the respective sets of alternate longitudinal members 2, as shown due to the fact that they span the respective sets of alternate longitudinal members.

Referring now to Figures 1 and 3, it will be noted that each transverse member 3 meets or intersects two of the diagonal members 4, at each of its points of intersection 8 with the alternate longitudinal members 2. Between these points of intersection 8 the transverse circumferential frame members 3 or more particularly the cords 6, 6' thereof cross the longitudinal members 2, being, however, spaced inwardly therefrom at such crossing points 8'. The longitudinal members 2 preferably overlie the cords 3 at the centers of such cords as illustrated in Figures 1, 2 and 3, and in order to make it possible to stamp the frame out of sheet metal the transverse members 3 are severed from the longitudinal members 2 and joined at their ends by welding or riveting, as best illustrated in Figure 3. This joining may be accomplished by welding or riveting short strips of metal at channels 9, to both of the ends 10 of the transverse circumferential members 3 where they are severed on each side of the longitudinal members 2.

When the frame is made of sheet metal as described and illustrated, it is best formed of a channel shaped cross section as shown in Figure 2, the metal frame members being stamped a little wider than would otherwise be necessary and the edges being turned up in the form of flanges 11, Figures 2 and 3. The combination of longitudinal members 2, transverse circumferential members 3, arranged in the form of alternate cords 6, meeting and connecting at said alternate longitudinal members 2, together with the diagonal members 4, connecting the said meeting points, gives a framework of extreme strength and relative rigidity in proportion to the weight of metal employed and one which is much cheaper to construct than any hitherto known in that it can be made quickly in quantities, largely by means of automatic machinery.

While the frame has been referred to as relatively rigid, it also possesses the desirable resiliency to a high degree.

I have thus described specifically and in detail a fuselage embodying the features of my invention in the preferred form in order that the nature, manner of constructing and of using the same may be fully understood, however, the terms herein are used descriptively rather than in a limiting sense and the scope of the invention is defined in the claims.

What I claim as new and desire to secure by Letters Patent is:

1. A fuselage frame comprising longitudinal members spaced about the transverse circumference, transverse circumferential members intersecting and connecting alternating longitudinal members forming points of intersection and diagonal members extending substantially the entire length of the fuselage and connecting said points of intersection.

2. A fuselage frame comprising longitudinal members spaced about the transverse circumference, transverse circumferential members intersecting and connecting alternating longitudinal members and forming points of intersection and diagonal members extending substantially the entire length of the fuselage and connecting said points of intersection, the cross section of the fuselage being of a curvilinear outline and the portions of the transverse circumferential members between said points of intersection forming cords of said curve and being spaced inwardly from part of said longitudinal members.

3. A fuselage frame comprising longitudinal members spaced about the transverse circumference of the fuselage, transverse circumferential members intersecting and connecting alternating longitudinal members forming points of intersection and diagonal members extending substantially the entire length of the fuselage and connecting said points of intersection, said frame members being adapted to be stamped from sheet metal.

4. A fuselage frame comprising longitudinal members spaced about the transverse circumference of the fuselage, transverse circumferential members intersecting and connecting alternating longitudinal members and forming points of intersection, and diagonal members extending substantially the entire length of the fuselage and connecting said points of intersection, said longitudinal members, diagonal members and intersections being integral and being adapted to be stamped as a whole from metal sheets.

5. An airplane fuselage frame composed of longitudinal members and transverse circumferential members intersecting part only of the longitudinal members and forming points of intersection and diagonal members connecting the points of intersection.

6. An airplane fuselage frame composed of longitudinal members and transverse circumferential members intersecting part only of the longitudinal members and forming points of intersection and diagonal members connecting the points of intersection, said longitudinal members, diagonal members and transverse members being integral at said points of intersection and adapted to be stamped from a single sheet of metal.

7. An airplane fuselage frame composed of longitudinal members and transverse circumferential members intersecting part only of the longitudinal members and diagonal members connecting the points of intersection, said longitudinal members, diagonal members and transverse members being integral at said points of intersection and adapted to be stamped from a single piece of sheet metal, the transverse members crossing and being spaced inwardly from the remainder of said longitudinal members.

8. An airplane fuselage frame composed of longitudinal members and transverse circumferential members intersecting part only of the longitudinal members and diagonal members connecting the points of intersection, said longitudinal members, diagonal members and transverse members being integral at said points of intersection and adapted to be stamped from sheet metal, the transverse members crossing and being spaced inwardly from the remainder of said longitudinal members and spliced adjacent said crossing.

Signed by me at Baltimore, Maryland, this 20th day of September, 1929.

ARTHUR B. STEUART.